(12) United States Patent
Cavaliere et al.

(10) Patent No.: US 11,290,207 B2
(45) Date of Patent: Mar. 29, 2022

(54) OPTICAL TRANSCEIVER APPARATUS AND METHOD

(71) Applicant: Telefonaktiebolaget LM Ericsson (PUBL), Stockholm (SE)

(72) Inventors: Fabio Cavaliere, Pisa (IT); Paolo Debenedetti, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 12 days.

(21) Appl. No.: 16/976,186

(22) PCT Filed: Mar. 14, 2018

(86) PCT No.: PCT/EP2018/056427
§ 371 (c)(1),
(2) Date: Aug. 27, 2020

(87) PCT Pub. No.: WO2019/174728
PCT Pub. Date: Sep. 19, 2019

(65) Prior Publication Data
US 2020/0412478 A1    Dec. 31, 2020

(51) Int. Cl.
*G01R 31/28* (2006.01)
*H04L 1/00* (2006.01)
(Continued)

(52) U.S. Cl.
CPC ......... *H04L 1/0041* (2013.01); *H04B 10/516* (2013.01); *H04B 10/6165* (2013.01); *H04L 1/0045* (2013.01); *H04B 10/40* (2013.01)

(58) Field of Classification Search
CPC ... H04L 1/0041; H04L 1/0045; H04B 10/516; H04B 10/6165; H04B 10/40
See application file for complete search history.

(56) References Cited

U.S. PATENT DOCUMENTS 10,210,750 B2 * 2/2019 Knapp ............... H04L 12/282
2013/0183042 A1   7/2013 Knapp et al.

FOREIGN PATENT DOCUMENTS

| EP | 0 196 347 A1 | 10/1986 |
| EP | 0 940 940 A2 | 9/1999 |
| WO | 2004 019578 A1 | 3/2004 |

OTHER PUBLICATIONS

PCT Notification of Transmittal of the Internatoinal Search Report and the Written Opinion of the International Searching Authority, or the Declaration issued for International application No. PCT/EP2018/056427—dated Jan. 4, 2019.

* cited by examiner

*Primary Examiner* — Samir W Rizk
(74) *Attorney, Agent, or Firm* — Baker Botts, LLP

(57) ABSTRACT

Optical transmitter apparatus (100) comprising: a transmitter optical subassembly (130) configured to transmit forward error correction, FEC, codewords on an optical carrier signal; a memory device (110) containing local configuration data; and processing circuitry (120) configured to: receive client signal data and perform FEC encoding on the client signal data to form a sequence of FEC codewords; receive local configuration data from the memory device; obtain a configuration payload pattern of FEC codewords having a FEC code violation and FEC codewords not having a FEC code violation, the configuration payload pattern representing the local configuration data; create FEC code violations within FEC codewords of said sequence according to the configuration payload pattern to form a configuration payload modified sequence of FEC codewords; and provide the configuration payload modified sequence of FEC codewords to the transmitter optical subassembly for transmission.

15 Claims, 9 Drawing Sheets

(51) Int. Cl.
*H04B 10/516* (2013.01)
*H04B 10/61* (2013.01)
*H04B 10/40* (2013.01)

|  | CV | 0 | 0 | CV | 0 |
|---|---|---|---|---|---|
| START | 255, 239 | 255, 239 | 255, 239 | 255, 239 | 255, 239 |
|  | CV | CV | 0 | CV | CV |
| STOP | 255, 239 | 255, 239 | 255, 239 | 255, 239 | 255, 239 |
|  | CV | CV | 0 | 0 | CV |
| ACK | 255, 239 | 255, 239 | 255, 239 | 255, 239 | 255, 239 |
|  | 0 | CV | 0 | 0 | CV |
| Bit 0 | 255, 239 | 255, 239 | 255, 239 | 255, 239 | 255, 239 |
|  | 0 | CV | 0 | CV | 0 |
| Bit 1 | 255, 239 | 255, 239 | 255, 239 | 255, 239 | 255, 239 |

OPTICAL TRANSCEIVER APPARATUS AND METHOD

PRIORITY

This nonprovisional application is a U.S. National Stage Filing under 35 U.S.C. § 371 of International Patent Application Serial No. PCT/EP2018/056427 filed Mar. 14, 2018 and entitled "OPTICAL TRANSCEIVER APPARATUS AND METHOD" which is hereby incorporated by reference in its entirety.

TECHNICAL FIELD

The invention relates to optical transmitter apparatus, optical receiver apparatus and optical transceiver apparatus. The invention further relates to a method at optical transmitter apparatus of an optical communications network and to a method at optical receiver apparatus of an optical communications network.

BACKGROUND

The Link Layer Discovery Protocol, LLDP, is a vendor-neutral link layer protocol in the Internet Protocol Suite used by devices within a local area network according to the IEEE 802 standard, principally wired Ethernet, for advertising their identity, capabilities and neighbours. LLDP is formally referred to by the IEEE as Station and Media Access Control Connectivity Discovery specified in IEEE 802.1AB and IEEE 802.3-2012, section 6, clause 79.

It is desirable to perform the tasks of advertising device identity, capabilities, and neighbours in networks that do not implement the Ethernet standard or where Ethernet is just one of the possible carried signal formats. Optical Transport Networks, OTN, compliant with ITU-T Recommendation G.709 are an example of the former type of network, and dense wavelength division multiplexing, DWDM, networks, where wavelength channels can transparently transport different types of client signals, such as Ethernet, OTN, Common Public Radio Interface, CPRI, are an example of the latter. Current link discovery methods are based on protocol stacks which are either specific to the Ethernet standard or to a vendor-specific implementation. This makes them inapplicable to networks that do not use Ethernet (or only on Ethernet) as transport technology or to multi-vendor networks.

SUMMARY

It is an object to provide an improved optical transmitter apparatus. It is a further object to provide an improved optical receiver apparatus. It is a further object to provide an improved optical transceiver apparatus. It is a further object to provide an improved method at optical transmitter apparatus of an optical communications network of transmitting local configuration data. It is a further object to provide an improved method at optical receiver apparatus of an optical communications network of receiving local configuration data of a remote optical transmitter apparatus.

An aspect of the invention provides optical transmitter apparatus comprising a transmitter optical subassembly, a memory device and processing circuitry. The transmitter optical subassembly is configured to transmit forward error correction, FEC, codewords on an optical carrier signal. The memory device contains local configuration data. The processing circuitry is configured to receive client signal data and perform FEC encoding on the client signal data to form a sequence of FEC codewords. The processing circuitry is also configured to receive local configuration data from the memory device. The processing circuitry is also configured to obtain a configuration payload pattern. A configuration payload pattern is a pattern of FEC codewords having a FEC code violation and FEC codewords not having a FEC code violation. The configuration payload pattern represents the local configuration data. The processing circuitry is configured to create FEC code violations within FEC codewords of said sequence according to the configuration payload pattern, to form a configuration payload modified sequence of FEC codewords. The processing circuitry is configured to provide the configuration payload modified sequence of FEC codewords to the transmitter optical subassembly for transmission.

The optical transmitter apparatus is advantageously configured to transmit local configuration data based on creation of code-violations within FEC codewords of a client data signal, enabling local configuration data to be transmitted without requiring mapping or wrapping of the client data signal. The optical transmitter apparatus may therefore transmit local configuration data without affecting the client signal latency and may therefore be used for transmitting time sensitive signals like CPRI and eCPRI. Advantageously, lack of wrapping or mapping, and no increase in latency, means that transmission of the client signal is transparent to transmission of local configuration data. Operating in this way means that optical transmitter apparatus advantageously transmits local configuration data using a completely in-band, secure channel.

The optical transmitter apparatus may support link discovery solutions operating at Layer 1, the physical layer, which may be more cost effective than complex protocol stacks implemented at upper layers of a communications network and may facilitate the coexistence, within the same network, of optical interfaces provided by different vendors or that can be configured to carry multiple client signals. The optical transmitter apparatus is compatible with existing small form pluggable optical transceiver modules, SFPs, which are available on the market and deployed in large volumes.

In an embodiment, the processing circuitry is further configured to obtain a START message pattern. The START message pattern is a pattern of FEC codewords having a FEC code violation and FEC codewords not having a FEC code violation. The processing circuitry is also configured to create FEC code violations within FEC codewords of said sequence of FEC codewords according to the START message pattern to form a START message modified sequence of FEC codewords. The processing circuitry is configured to provide the START message modified sequence of FEC codewords to the transmitter optical subassembly for transmission before transmission of the configuration payload modified sequence of FEC codewords.

Transmitting a START message advantageously indicates that subsequent patterns of FEC codewords with and without code violations will be configuration payload patterns. This provides the advantage that a configuration payload pattern does not require any identification content, such as a header identifying the pattern as a payload pattern. The number of code violations introduced into the FEC codewords encoding the client signal data may therefore be kept below a correctable bit error rate, BER, of a FEC algorithm used for FEC decoding the FEC codewords at remote optical receiver apparatus.

In an embodiment, the processing circuitry is further configured to obtain a STOP message pattern. The STOP message pattern is a predetermined pattern of FEC codewords having a FEC code violation and FEC codewords not having a FEC code violation. The processing circuitry is also configured to create FEC code violations within FEC codewords of said sequence of FEC codewords according to the STOP message pattern to form a STOP message modified sequence of FEC codewords. The processing circuitry is configured to provide the STOP message modified sequence of FEC codewords to the transmitter optical subassembly for transmission after stopping transmission of configuration payload modified sequences of FEC codewords.

In an embodiment, the FEC code violations are FEC correctable errors. Advantageously, while the BER of a FEC codeword is increased slightly by creating a code violation within the FEC codeword, the BER remains correctable by a FEC decoder, so the client signal quality is not affected by transmitting the local configuration data; transmission of the client signal is therefore transparent to transmission of local configuration data.

In an embodiment, the forward error correction, FEC, encoding is Reed Solomon, RS, encoding. In an embodiment, the forward error correction, FEC, encoding is RS 255, 239 encoding. The optical transmitter apparatus may therefore be used with 25 Gbit/s client interfaces.

In an embodiment, the local configuration data comprises at least part of at least one of identification data of the optical transmitter apparatus, an indication of a host node within which the optical transmitter apparatus is located and a serial number of the optical transmitter apparatus.

In an embodiment, the processing circuitry comprises a programmable device and a processor.

In an embodiment, the programmable device is a field programmable gate array, FPGA.

References to processors or processing circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

In an embodiment, the FEC code violations are non-sequential. This may ensure that encoding the local configuration data onto the FEC codewords does not increase the BER of the FEC codewords to above a FEC correctable level.

In an embodiment, obtaining a configuration payload pattern comprises mapping the local configuration data to one of a plurality of predetermined configuration payload patterns each representing at least one bit of data.

In an embodiment, the processing circuitry is configured to perform forward error correction, FEC, encoding on the local configuration data and obtaining a configuration payload pattern comprises obtaining a configuration payload pattern for the FEC encoded local configuration data.

In an embodiment, the processing circuitry is configured to perform 10, 8 FEC encoding on the local configuration data.

In an embodiment, the processing circuitry is configured to apply an XOR mask to a FEC codeword to create a FEC code violation within the FEC codeword.

Corresponding embodiments are applicable to the optical receiver apparatus and optical transceiver apparatus described below.

An aspect of the invention provides optical receiver apparatus comprising a receiver optical subassembly and processing circuitry. The receiver optical subassembly is configured to obtain FEC codewords from an optical carrier signal received from a remote optical transmitter apparatus. The processing circuitry is configured to perform FEC decoding on the received FEC codewords to extract client signal data. The processing circuitry is also configured to detect a configuration payload pattern within a sequence of received FEC codewords. A configuration payload pattern is a predetermined pattern of FEC codewords having a FEC code violation and FEC codewords not having a FEC code violation. The processing circuitry is configured to extract configuration data of the remote optical transceiver from the detected configuration payload pattern.

The optical receiver apparatus is advantageously configured to receive local configuration data encoded as code-violations within FEC codewords of a client data signal, enabling local configuration data to be received without requiring de-mapping or unwrapping from the client data signal. The optical receiver apparatus may therefore be used for receiving time sensitive signals like CPRI and eCPRI. The optical receiver apparatus advantageously receives local configuration data on a completely in-band, secure channel.

The optical receiver apparatus may support link discovery solutions operating at Layer 1, the physical layer, which may be more cost effective than complex protocol stacks implemented at upper layers of a communications network and may facilitate the coexistence, within the same network, of optical interfaces provided by different vendors or that can be configured to carry multiple client signals. The optical receiver apparatus is compatible with existing small form pluggable optical transceiver modules, SFPs, which are available on the market and deployed in large volumes.

In an embodiment, the processing circuitry is configured to detect a START message pattern within a sequence of received FEC codewords. The START message pattern is a predetermined pattern of FEC codewords having a FEC code violation and FEC codewords not having a FEC code violation. The processing circuitry is configured to detect a configuration payload pattern within a subsequent sequence of received FEC codewords.

Detecting a START message advantageously indicates that subsequent patterns of FEC codewords with and without code violations will be configuration payload patterns. This provides the advantage that a configuration payload pattern does not require any identification content, such as a header identifying the pattern as a payload pattern. The number of code violations introduced into the FEC codewords encoding the client signal data may therefore be kept below a correctable bit error rate, BER, of a FEC algorithm used for FEC decoding of FEC codewords at the optical receiver apparatus.

In an embodiment, the processing circuitry is configured to correlate detected patterns of FEC codewords having a FEC code violation and FEC codewords not having a FEC code violation with at least one of a plurality of stored configuration payload patterns and a START message pattern to detect at least one of a configuration payload pattern and a START message pattern within a sequence of received FEC codewords.

In an embodiment, the processing circuitry is configured to apply a decorrelation filter to a detected configuration payload pattern to extract configuration data of the remote optical transmitter apparatus.

In an embodiment, the processing circuitry is configured to apply an XOR mask to a received FEC codeword to remove a codeword violation from the FEC codeword.

An aspect of the invention provides optical transceiver apparatus comprising optical transmitter apparatus and optical receiver apparatus. The optical transmitter apparatus comprises a transmitter optical subassembly, a memory device and processing circuitry. The transmitter optical subassembly is configured to transmit FEC codewords on an optical carrier signal. The memory device contains local configuration data. The processing circuitry is configured to receive client signal data and perform forward error correction, FEC, encoding on the client signal data to form a sequence of FEC codewords. The processing circuitry is also configured to receive local configuration data from the memory device. The processing circuitry is also configured to obtain a configuration payload pattern. A configuration payload pattern is a pattern of FEC codewords having a FEC code violation and FEC codewords not having a FEC code violation. The configuration payload pattern represents the local configuration data. The processing circuitry is configured to create FEC code violations within FEC codewords of said sequence according to the configuration payload pattern, to form a configuration payload modified sequence of FEC codewords. The processing circuitry is configured to provide the configuration payload modified sequence of FEC codewords to the transmitter optical subassembly for transmission. The optical receiver apparatus comprises a receiver optical subassembly and processing circuitry. The receiver optical subassembly is configured to obtain FEC codewords from an optical carrier signal received from a remote optical transmitter apparatus. The processing circuitry is configured to perform FEC decoding on the received FEC codewords to extract client signal data. The processing circuitry is also configured to detect a configuration payload pattern within a sequence of received FEC codewords. The processing circuitry is configured to extract configuration data of the remote optical transceiver from the detected configuration payload pattern.

The optical transceiver apparatus is advantageously configured to transmit and receive local configuration data transmitted encoded as code-violations within FEC codewords of a client data signal, enabling local configuration data to be transmitter without requiring mapping or wrapping of the client data signal. The optical transceiver apparatus may therefore transmit local configuration data without affecting the client signal latency and may therefore be used for transmitting time sensitive signals like CPRI and eCPRI. Advantageously, lack of wrapping or mapping, and no increase in latency, means that transmission of the client signal is transparent to transmission of local configuration data. Operating in this way means than optical transceiver apparatus advantageously transmits and receives local configuration data using a completely in-band, secure channel.

The optical transceiver apparatus may support link discovery solutions operating at Layer 1, the physical layer, which may be more cost effective than complex protocol stacks implemented at upper layers of a communications network and may facilitate the coexistence, within the same network, of optical interfaces provided by different vendors or that can be configured to carry multiple client signals. The optical transceiver apparatus is compatible with existing small form pluggable optical transceiver modules, SFPs, which are available on the market and deployed in large volumes.

In an embodiment, the optical transceiver apparatus is a small form factor pluggable, SFP, optical transceiver.

In an embodiment, the processing circuitry of the optical transmitter apparatus is configured to receive an indication from the processing circuitry of the optical receiver apparatus that a START message pattern has been detected within a sequence of received FEC codewords. The processing circuitry of the optical transmitter apparatus is configured to obtain an ACK message pattern. The ACK message pattern is a predetermined pattern of FEC codewords having a FEC code violation and FEC codewords not having a FEC code violation. The processing circuitry is configured to create FEC code violations within FEC codewords of said sequence of FEC codewords according to the ACK message pattern to form an ACK message modified sequence of FEC codewords. The processing circuitry is configured to provide the ACK message modified sequence of FEC codewords to the transmitter optical subassembly for transmission to the remote optical transceiver apparatus. The processing circuitry of the optical receiver apparatus is configured to detect an ACK message pattern within a sequence of received FEC codewords. The processing circuitry of the optical transmitter apparatus is configured to receive an indication from the processing circuitry of the optical receiver apparatus that an ACK message pattern has been detected within a sequence of received FEC codewords. The processing circuitry of the optical transmitter apparatus is configured to provide the configuration payload modified sequence of FEC codewords to the transmitter optical subassembly for transmission only after receiving an indication that an ACK message pattern has been detected.

The optical transceiver apparatus is advantageously configured only to transmit its local configuration data following receipt of an ACK message from a remote optical transceiver apparatus, indicating that the remote optical transceiver apparatus is able to receive the local configuration data. Advantageously, if no ACK message is received in response to sending a START message, the optical transceiver apparatus does not transmit the local configuration data on the client signal data FEC codewords. This advantageously avoids adding code violations, i.e. FEC correctable errors, to the client signal data FEC codewords is the remote optical transceiver apparatus does not support receiving the local configuration data.

An aspect of the invention provides a method at optical transmitter apparatus of an optical communications network comprising steps of: receiving client signal data and performing forward error correction, FEC, encoding on the client signal data to form a sequence of FEC codewords; receiving local configuration data of the optical transmitter; obtaining a configuration payload pattern of FEC codewords having a FEC code violation and FEC codewords not having a FEC code violation, the configuration payload pattern representing the local configuration data; creating FEC code violations within FEC codewords of said sequence according to the configuration payload pattern to form a configuration payload modified sequence of FEC codewords; and transmitting the configuration payload modified sequence of FEC codewords on an optical carrier signal to a remote optical receiver apparatus.

The method advantageously transmits local configuration data based on creation of code-violations within FEC codewords of a client data signal, enabling local configuration data to be transmitted without requiring mapping or wrapping of the client data signal. The method may therefore transmit local configuration data without affecting the client signal latency and may therefore be used for transmitting time sensitive signals like CPRI and eCPRI. Advantageously, lack of wrapping or mapping, and no increase in latency, means that transmission of the client signal is transparent to transmission of local configuration data. The method advantageously transmits local configuration data using a completely in-band, secure channel.

The method may support link discovery solutions operating at Layer 1, the physical layer, which may be more cost effective than complex protocol stacks implemented at upper layers of a communications network and may facilitate the coexistence, within the same network, of optical interfaces provided by different vendors or that can be configured to carry multiple client signals. The method is compatible with existing small form pluggable optical transceiver modules, SFPs, which are available on the market and deployed in large volumes.

An aspect of the invention provides a method at optical receiver apparatus of an optical communications network comprising steps of: obtaining FEC codewords from an optical carrier signal received from a remote optical transmitter apparatus; performing FEC decoding on the received FEC codewords to extract client signal data; detecting a configuration payload pattern of FEC codewords having a FEC code violation and FEC codewords not having a FEC code violation within a sequence of received FEC codewords; and extracting configuration data of the remote optical transmitter apparatus from the detected configuration payload pattern.

The method advantageously receives local configuration data encoded as code-violations within FEC codewords of a client data signal, enabling local configuration data to be received without requiring de-mapping or unwrapping of the client data signal. The method may therefore be used for time sensitive signals like CPRI and eCPRI. The method advantageously receives local configuration data on a completely in-band, secure channel.

The method may support link discovery solutions operating at Layer 1, the physical layer, which may be more cost effective than complex protocol stacks implemented at upper layers of a communications network and may facilitate the coexistence, within the same network, of optical interfaces provided by different vendors or that can be configured to carry multiple client signals. The method is compatible with existing small form pluggable optical transceiver modules, SFPs, which are available on the market and deployed in large volumes.

An aspect of the invention provides a computer program, comprising instructions which, when executed on at least one processor, cause the at least one processor to carry out any of the above steps of the method at optical transmitter apparatus of an optical communications network.

An aspect of the invention provides a computer program, comprising instructions which, when executed on at least one processor, cause the at least one processor to carry out any of the above steps of the method at optical receiver apparatus of an optical communications network.

Embodiments of the invention will now be described, by way of example only, with reference to the accompanying drawings.

DETAILED DESCRIPTION

The same reference numbers will used for corresponding features in different embodiments.

Figure 1:
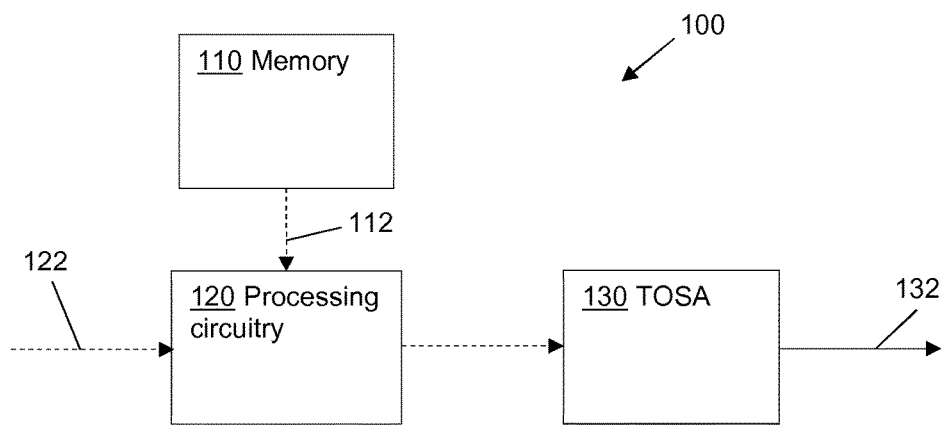
FIGS. 1 and 3 illustrate optical transmitter apparatus according to embodiments of the invention.

Referring to FIG. 1, an embodiment of the invention provides optical transmitter apparatus 100 comprising a transmitter optical subassembly 130, a memory device 110 and processing circuitry 120.

The transmitter optical subassembly, TOSA, 130 is configured to transmit forward error correction, FEC, codewords on an optical carrier signal 132. The memory device 110 may, for example, be an EEPROM, and contains local configuration data of the optical transmitter apparatus. The local configuration data is any data relating to the configuration of the optical transmitter apparatus itself, and may, for example, include identification data of the optical transmitter apparatus, an indication of a host node within which the optical transmitter apparatus is located and a serial number of the optical transmitter apparatus.

The processing circuitry 120 is configured to receive client signal data 122 and perform FEC encoding on the client signal data to form a sequence of FEC codewords.

A FEC codeword consists of a number of client signal data symbols and a number of parity symbols, combined together. For example, a Reed-Solomon FEC code is made by taking k client signal data symbols of s bits each and adding parity symbols to form an n symbol codeword; there are n-k parity symbols of s bits each. A Reed-Solomon decoder can correct up to t symbols that contain errors in a codeword, where $2t=n-k$.

The processing circuitry is configured to receive local configuration data 112 from the memory device and to obtain a configuration payload pattern representing the local configuration data. The configuration payload pattern is a pattern of FEC codewords having a FEC code violation and FEC codewords not having a FEC code violation.

The processing circuitry is configured to create FEC code violations within FEC codewords of the sequence of FEC codewords, according to the configuration payload pattern, to form a configuration payload modified sequence of FEC codewords. The processing circuitry is configured to provide the configuration payload modified sequence of FEC codewords to the transmitter optical subassembly for transmission.

Figures 9, 10:
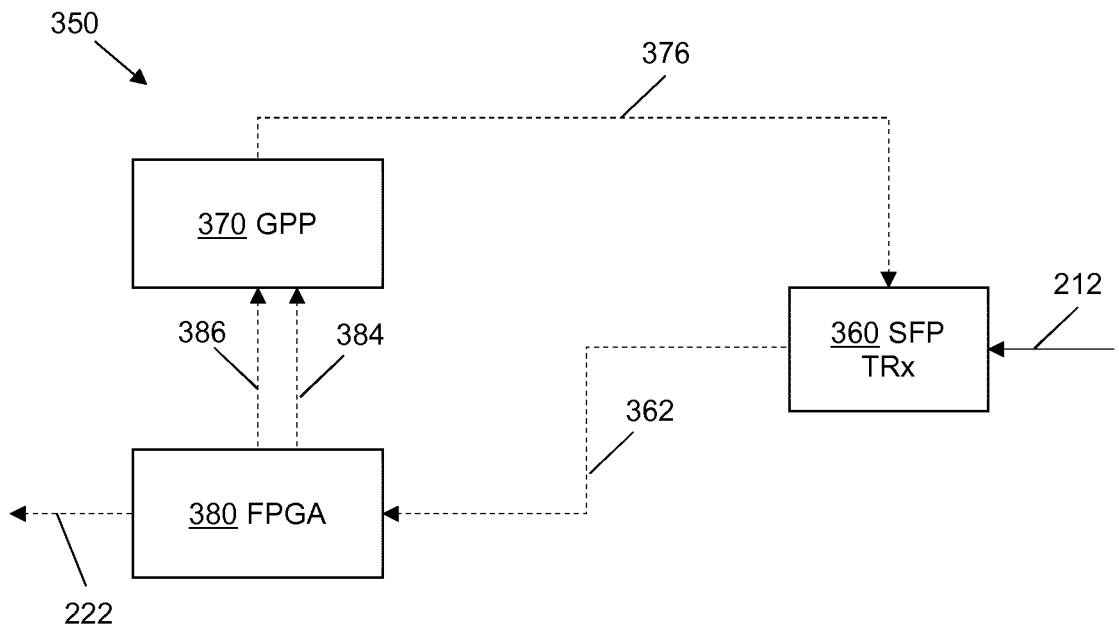
FIG. 10 illustrates a START message pattern, a STOP message pattern, an ACK message pattern, a Bit 0 pattern and a Bit 1 pattern.

In an embodiment, the processing circuitry 120 is further configured to obtain a START message pattern. The START message pattern is a predetermined pattern of FEC codewords having a FEC code violation, CV, and FEC codewords not having a FEC code violation, 0. For example, as illustrated in FIG. 10, the START message pattern may be: CV, 0, 0, CV, 0.

The processing circuitry is configured to create FEC code violations within FEC codewords of the sequence of FEC codewords according to the START message pattern, to form a START message modified sequence of FEC codewords. The processing circuitry is configured to provide the START message modified sequence of FEC codewords to the transmitter optical subassembly for transmission before transmission of the configuration payload modified sequence of FEC codewords.

In an embodiment, the FEC code violations are non-sequential.

Figure 2:
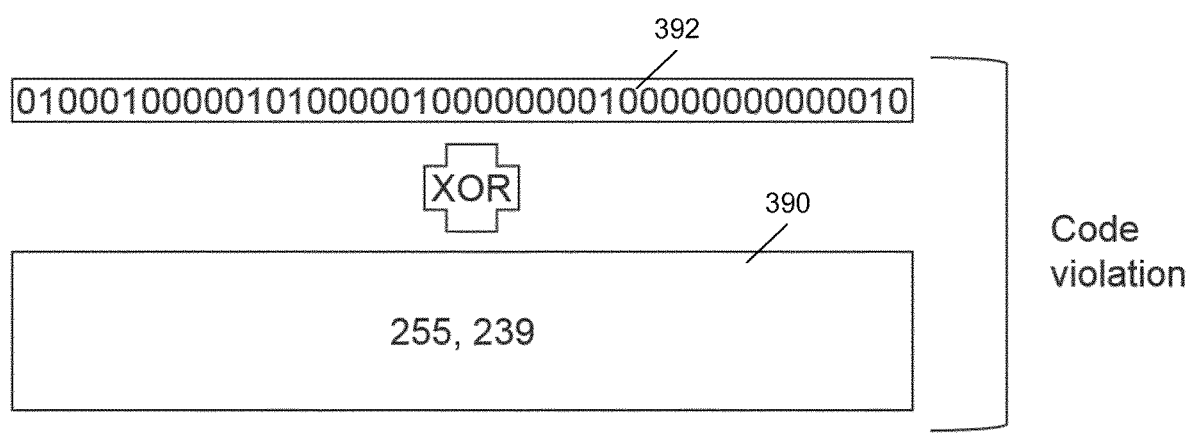
FIG. 2 illustrates creation of a code violation in a Reed-Solomon (255, 239) codeword.

Referring to FIG. 2, in an embodiment the processing circuitry is configured to apply an XOR bit mask 392 to a FEC codeword, for example a Reed Solomon (255, 239) codeword 390, to form a FEC code violation within the codeword. The FEC code violation comprises FEC correctable errors 392. The errors forming the code violation must be sufficiently different to noise to be recognisable as a pattern, whilst still being FEC correctable errors.

In an embodiment, the forward error correction, FEC, encoding is Reed Solomon, RS, encoding, in particular RS 255, 239 encoding may be used.

In an embodiment, the processing circuitry is configured to obtain a configuration payload pattern representing the local configuration data by mapping the local configuration data to one of a plurality of predetermined configuration payload patterns. Each of the predetermined configuration payload patterns represents at least one bit of data. For example, referring to FIG. 10, a bit 0 of local configuration data is mapped to a Bit 0 configuration payload pattern 0, CV, 0, 0, CV, and a bit 1 of local configuration data is mapped to a Bit 1 configuration payload pattern 0, CV, 0, CV, 0.

The processing circuitry is configured to then create FEC code violations within FEC codeword of the sequence of FEC codewords encoding the client signal data. So, following the example in FIG. 10, a bit 1 of local configuration data is encoded onto a sequence of five FEC codewords, the first with no code violation, the second having a code violation, the third and fourth having no code violation and the fifth having a code violation. And, a bit 0 of local configuration data is encoded onto a sequence of five FEC codewords, the first with no code violation, the second having a code violation, the third with no code violation, the fourth having a code violation and the fifth having no code violation.

In an embodiment, the processing circuitry is further configured to obtain a STOP message pattern. The STOP message pattern is a pattern of FEC codewords having a FEC code violation and FEC codewords not having a FEC code violation, as, for example, illustrated in FIG. 10. The processing circuitry is also configured to create FEC code violations within FEC codewords of said sequence of FEC codewords according to the STOP message pattern to form a STOP message modified sequence of FEC codewords. The processing circuitry is configured to provide the STOP message modified sequence of FEC codewords to the transmitter optical subassembly for transmission after stopping transmission of configuration payload modified sequences of FEC codewords.

Figure 3:
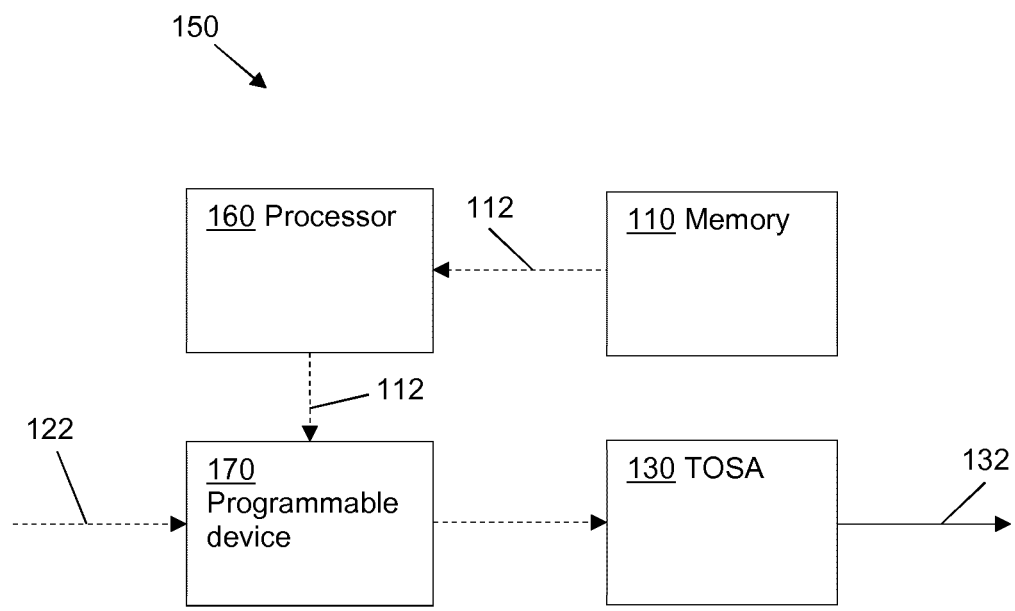

As illustrated in FIG. 3, in an embodiment the processing circuitry comprises a processor 160 and a programmable device 170. The processor 160 is configured to read the local configuration data 112 from the memory 110 and to provide the local configuration data to the programmable device.

The programmable device 170 is configured to receive client signal data 122 and to perform FEC encoding on the client signal data to form a sequence of FEC codewords. The programmable device is configured to receive the local configuration data 112 from the processor 160 and to obtain a configuration payload pattern representing the local configuration data.

The programmable device is configured to create FEC code violations within FEC codewords of the sequence of FEC codewords, according to the configuration payload pattern, to form a configuration payload modified sequence of FEC codewords. The programmable device is configured to provide the configuration payload modified sequence of FEC codewords to the transmitter optical subassembly for transmission.

In an embodiment, processor 160 is configured to perform FEC encoding on the local configuration data, for example FEC (10, 8) encoding, before the local configuration data is provided to the programmable device 170.

Figure 4:
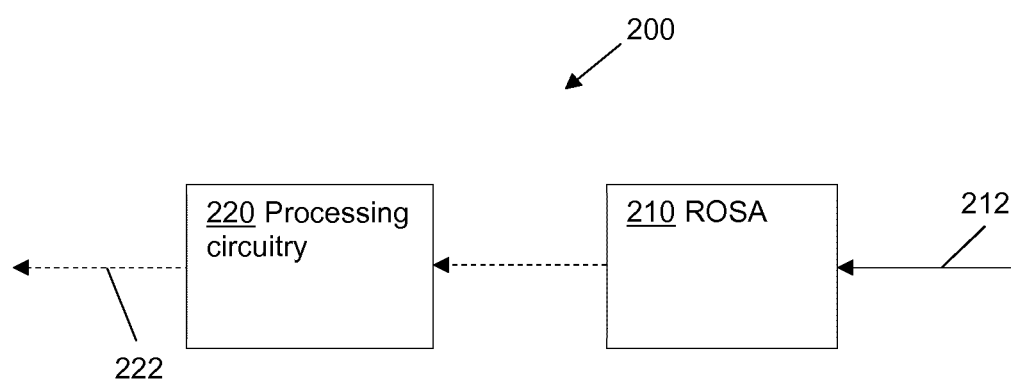
FIGS. 4 and 5 illustrate optical receiver apparatus according to embodiments of the invention.

Referring to FIG. 4, an embodiment of the invention provides optical receiver apparatus 200 comprising a receiver optical subassembly, ROSA, 210 and processing circuitry 220. The receiver optical subassembly 210 is configured to obtain FEC codewords from an optical carrier signal 212 received from a remote optical transmitter apparatus. The processing circuitry 220 is configured to perform FEC decoding on the received FEC codewords to extract client signal data 222. The processing circuitry is configured to detect a configuration payload pattern of FEC codewords having a FEC code violation and FEC codewords not having a FEC code violation within a sequence of received FEC codewords. The processing circuitry is configured to extract configuration data 262 of the remote optical transceiver from the detected configuration payload pattern.

In an embodiment, the processing circuitry 220 is configured to detect a START message pattern within a sequence of received FEC codewords. The processing circuitry is configured to then detect a configuration payload pattern within a subsequent sequence of received FEC codewords.

In an embodiment, the processing circuitry 220 is configured to detect a STOP message pattern within a sequence of received FEC codewords.

In an embodiment, the processing circuitry 220 is configured to correlate detected patterns of FEC codewords having a FEC code violation and FEC codewords not having a FEC code violation with a plurality of stored configuration payload patterns in order to detect a configuration payload pattern. The processing circuitry may also be configured to correlate detected patterns of FEC codewords having a FEC code violation and FEC codewords not having a FEC code violation with a predetermined START message pattern to detect a START message pattern within a sequence of received FEC codewords.

In an embodiment, the processing circuitry 220 is configured to apply a decorrelation filter to a detected configuration payload pattern to extract configuration data of the remote optical transmitter apparatus.

In an embodiment, the processing circuitry 220 is configured to apply an XOR bit mask to a received FEC codeword to remove a codeword violation from the FEC codeword.

In an embodiment, the processing circuitry 220 is configured to select the shortest distance match between the following two codewords: the received codeword itself; and the received codeword after applying an XOR bit mask, being the same as the XOR bit mask applied at the remote optical transmitter apparatus to create the code violation. If a code violation was present within the codeword, the bit mask will remove it, and if a code violation was not present, the bit mask will create a code violation. The processing circuitry is thereby able to remove the code violation errors introduced by the remote optical transmitter apparatus, operating as described above. This may also improve sensitivity to distinguish noise errors from the transmitted code violation.

Figure 5:
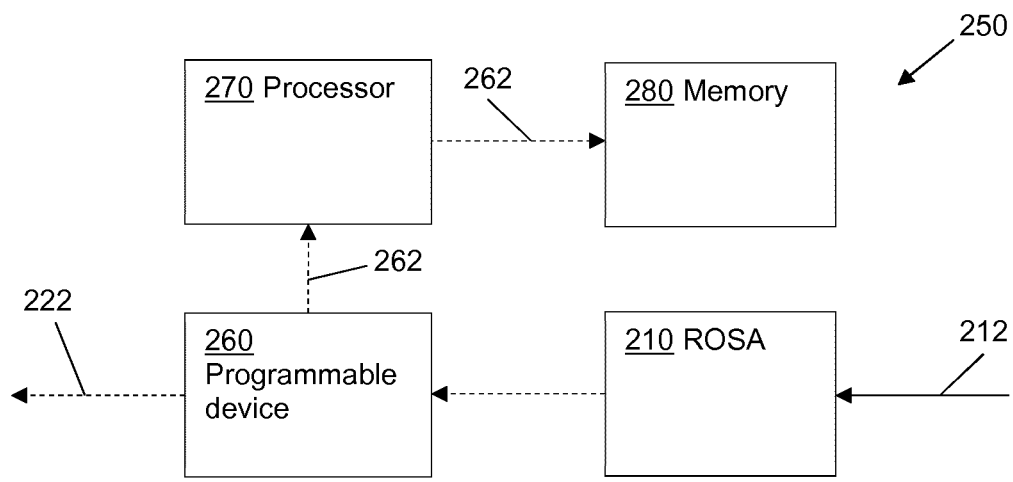

As illustrated in FIG. 5, in an embodiment the processing circuitry comprises a processor 270 and a programmable device 260. The programmable device 260 is configured to perform FEC decoding on the received FEC codewords to extract client signal data 222. The programmable device is configured to detect a configuration payload pattern of FEC codewords having a FEC code violation and FEC codewords not having a FEC code violation within a sequence of received FEC codewords. The programmable device is configured to extract configuration data 262 of the remote optical transceiver from the detected configuration payload pattern.

The processor 270 is configured to perform FEC decoding of the extracted configuration data 262, using a corresponding FEC algorithm to that used for FEC encoding at the remote optical transmitter apparatus, as described above. The processor 270 is configured to write the configuration data of the remote optical transmitter apparatus, 'remote configuration data', to a memory device 280, such as an EEPROM.

Figure 6:
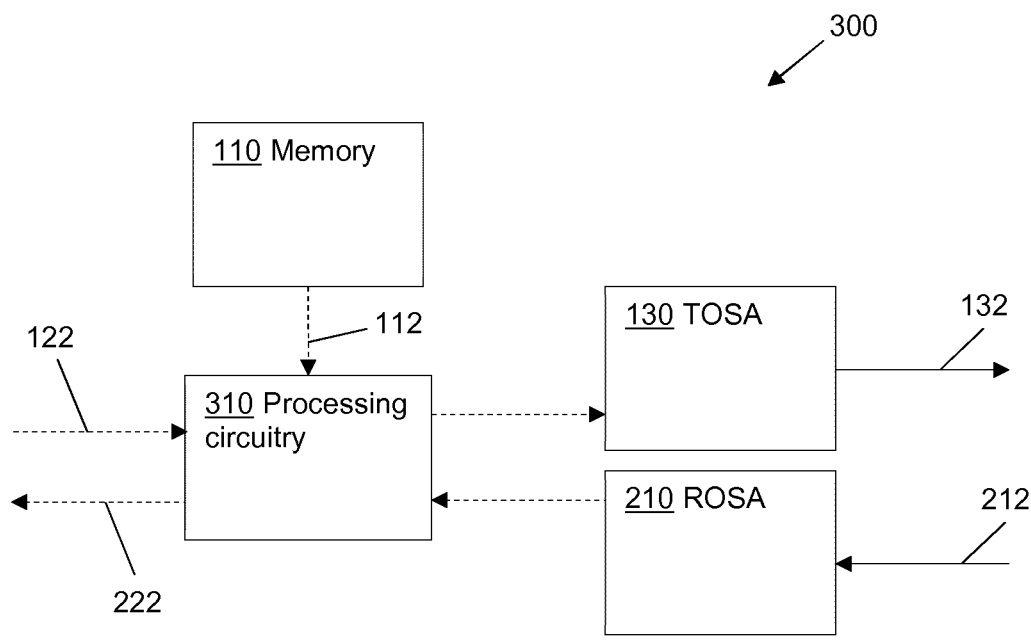
FIGS. 6 to 9 and 11 illustrate optical transceiver apparatus according to embodiments of the invention.

Referring to FIG. 6, an embodiment of the invention provides optical transceiver apparatus 300 comprising optical transmitter apparatus 100 and optical receiver apparatus 200, as described above. The optical transceiver apparatus 200 has a common processing circuitry 310 which is configured to perform as the respective processing circuitries 120 and 220 of the optical transmitter apparatus and optical receiver apparatus, as described above.

In an embodiment, the processing circuitry 310 is configured to detect a START message pattern within a sequence of FEC codewords received from a remote optical transceiver apparatus. The processing circuitry is configured to obtain an ACK message pattern. The ACK message pattern is a predetermined pattern of FEC codewords having a FEC code violation and FEC codewords not having a FEC code violation. The processing circuitry is configured to create FEC code violations within FEC codewords of a sequence of FEC codewords according to the ACK message pattern to form an ACK message modified sequence of FEC codewords. The processing circuitry is configured to provide the ACK message modified sequence of FEC codewords to the transmitter optical subassembly, TOSA, 130 for transmission to the remote optical transceiver apparatus.

The processing circuitry 310 is also configured to detect an ACK message pattern within a sequence of FEC codewords received from a remote optical transceiver apparatus. The processing circuitry is configured to provide the configuration payload modified sequence of FEC codewords to the transmitter optical subassembly for transmission only after receiving an indication that an ACK message pattern has been detected.

The optical transceiver apparatus 300 is thereby configured only to transmit its local configuration data following receipt of an ACK message from a remote optical transceiver apparatus, indicating that the remote optical transceiver apparatus is able to receive the local configuration data. If no ACK message is received in response to sending a START message, the optical transceiver apparatus does not transmit the local configuration data.

Figure 7:
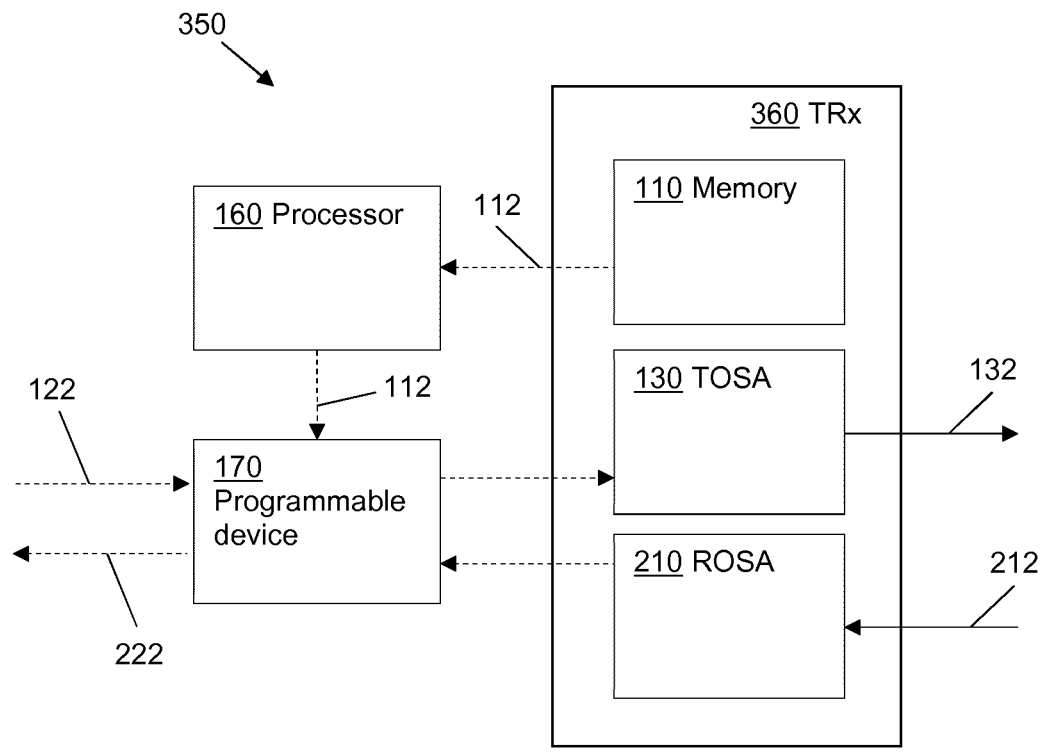

In an embodiment, illustrated in FIG. 7, the optical transceiver apparatus 350 comprises a small form factor pluggable, SFP, optical transceiver, TRx, 360 and processing circuitry. The processing circuitry comprises a processor 160 and a programmable device 170, configured as described above.

The SFP TRx 360 comprises the memory device 110, the TOSA 130 and the ROSA 210. The local configuration data contained within the memory device is local configuration data of the SFP TRx.

Figure 8:
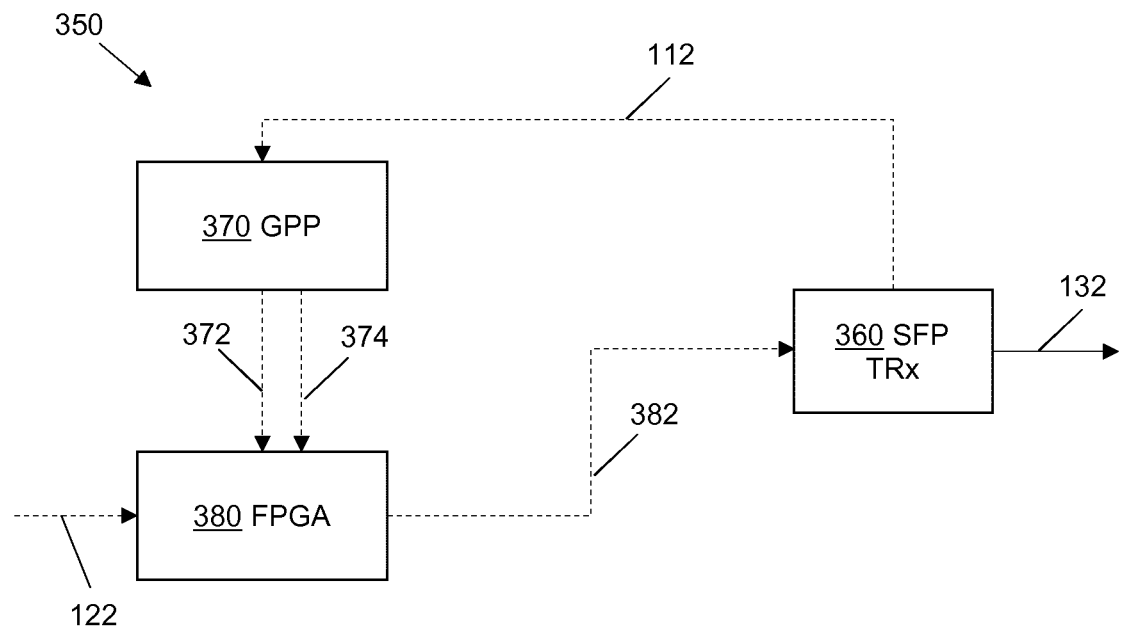

In an embodiment, illustrated in FIGS. 8 and 9, the processor is a general purpose processor, GPP, 370 and the programmable device is a field programmable gate array, FPGA, 380.

Referring to FIG. 8, on the transmitter side of the optical transceiver apparatus 350, the GPP is configured to read the local configuration data from the memory 110 of the SFP TRx and prepares to send it at a low rate to the FPGA. The GPP may also be configured to perform FEC (10, 8) encoding on the local configuration data before sending it to the FPGA. At predetermined times, or at a predetermined time interval, e.g. daily, the GPP sends local configuration data 372 to the FPGA. The GPP is also configured send an instruction 374 to the FPGA to start encoding local configuration data onto the client data signal.

The FPGA is configured to perform Reed Solomon (255, 239) FEC encoding on the client signal data 122 to form a sequence of RS FEC codewords.

The FPGA is configured to obtain a START message pattern, for example as shown in FIG. 10, and to create code violations, CV, within a sequence of RS (255, 239) FEC codewords according to the START message pattern, to form a START message modified sequence of RS FEC codewords. The FPGA is configured to provide the START message modified sequence of RS FEC codewords to the TOSA 130 of the SFP TRx 360 for transmission on an optical carrier signal 132, to a remote optical transceiver apparatus.

The FPGA 380 is configured to detect an ACK message pattern within a sequence of RS (255, 239) FEC codewords received from the remote optical transceiver apparatus. The FPGA 380 is configured to proceed with transmitting local configuration data only if an ACK message pattern is detected. If no ACK message is detected in response to the sent START message, the client data signal is transmitted as unmodified RS FEC codewords. A lack of ACK message indicates that the remote optical transceiver is not able to receive local configuration data encoded onto the RS FEC codewords by the optical transceiver apparatus. Such a remote optical transceiver will still be able to obtain the RS FEC codewords and to extract the client data signal because the code violations created in the RS FEC codewords, to encode bits of the local configuration data on the RS FEC codewords, are FEC correctable errors and so will be corrected by receiver apparatus at the remote optical transceiver. Only a marginal additional BER is added to the RS FEC codewords by transmitting the local configuration data, which does not affect the transmission of the RS FEC codewords.

The FPGA is configured to receive FEC encoded local configuration data 372 from the GPP 370. The FPGA is configured to obtain a configuration payload pattern representing a portion of the FEC encoded local configuration data. In this embodiment, a portion of local configuration data is a Bit 0 or a Bit 1 of the FEC (10, 8) encoded local configuration data. The FPGA is configured to map a Bit 0 to a Bit 0 configuration payload pattern and to map a Bit 1 to a Bit 1 configuration payload pattern, as illustrated in FIG. 10.

The FPGA is configured to create FEC code violations within codewords of the sequence of RS FEC codewords, according to the selected configuration payload pattern, to form a configuration payload modified sequence of RS FEC codewords. The FPGA is configured to provide the configuration payload modified sequence of FEC codewords 382 to the TOSA 130 for transmission on an optical carrier signal 132.

The FPGA is configured to continue mapping Bit 0s and Bit 1s of local configuration data to the corresponding configuration payload patterns, creating FEC code violations within codewords of the sequence of RS FEC codewords according to the configuration payload patterns, and providing the configuration payload modified sequences to the TOSA for transmission until all of the local configuration data has been transmitted.

The FPGA is configured to obtain a STOP message pattern, for example as shown in FIG. 10, once all of the local configuration data has been transmitted, and to create code violations, CV, within a sequence of RS (255, 239) FEC codewords according to the STOP message pattern, to form a STOP message modified sequence of RS FEC codewords. The FPGA is configured to provide the STOP message modified sequence of RS FEC codewords to the TOSA 130 of the SFP TRx 360 for transmission on an optical carrier signal 132, to the remote optical transceiver apparatus.

Referring to FIG. 9, on the receiver side of the optical transceiver apparatus, the FPGA 380 is configured to perform RS (255, 239) FEC decoding on FEC codewords received from a remote optical transceiver apparatus, to extract client signal data 222 sent from the remote optical transceiver apparatus. The FPGA is configured to detect patterns of FEC codewords containing code violations. The FPGA is configured to continuously correlate detected patterns of FEC codewords having code violations with stored predetermined START, STOP and ACK message patterns, searching for a START, STOP or ACK message pattern. The FPGA is configured with a threshold for likelihood of detection of a message pattern over normal fibre noise based errors within received RS FEC codewords.

The FPGA is configured to send a notification to the GPP following detection of a START message pattern within a sequence of received RS FEC codewords. The FPGA is configured to correlate subsequently detected patterns of RS FEC codewords having code violations with stored Bit 0 and Bit 1 configuration payload patterns in order to detect a configuration payload pattern, i.e. a Bit 0 configuration payload pattern or a Bit 1 configuration payload pattern, within a sequence of received RS FEC codewords. The FPGA is configured to extract encoded configuration data 262 of the remote optical transceiver, i.e. a Bit 0 or a Bit 1, from the detected configuration payload pattern and to send the encoded configuration data to the GPP.

The GPP 270 is configured to perform FEC decoding of the extracted configuration data 262, using a corresponding FEC algorithm to that used for FEC encoding at the remote optical transmitter apparatus, to obtain the configuration data of the remote optical transceiver apparatus. The processor 270 is configured to write the configuration data of the remote optical transmitter apparatus, 'remote configuration data', to a memory device 280, such as an EEPROM.

At the receiver side, the client data signal is affected by both errors due to noise (thermal noise, amplification noise, etc.) and the introduced code violations. However, the code violations are created at a time interval much longer than the RS FEC codeword duration, so the bit error rate, BER, of the received client data signal is not appreciably worse than when local configuration data is not being transmitted. Or, equivalently, the BER of the received modified sequence of RS FEC codewords is always lower that the FEC correction threshold of the FPGA, which is $5 \cdot 10^{-5}$ for an RS (255,239) code.

For example, for a 10 Gb/s client data signal, a maximum pre-FEC error rate of 10E-6 and 100 b/s local configuration data, the optical transceiver apparatus can achieve up to 3600 bits/hour or 144000 bits/day of configuration data exchanged between the optical transceiver apparatus and a remote optical transceiver apparatus. To further secure the transmission of the local configuration data it is possible to perform FEC coding, e.g. 10,8 coding, on the local configuration data, to reach up 2.88 Kb/hour or 10 Kb/day. Assuming that essential local configuration data for auto-discovery is up to 256 bytes, a complete discovery cycle can be completed in less than 1 hour.

Figure 11:
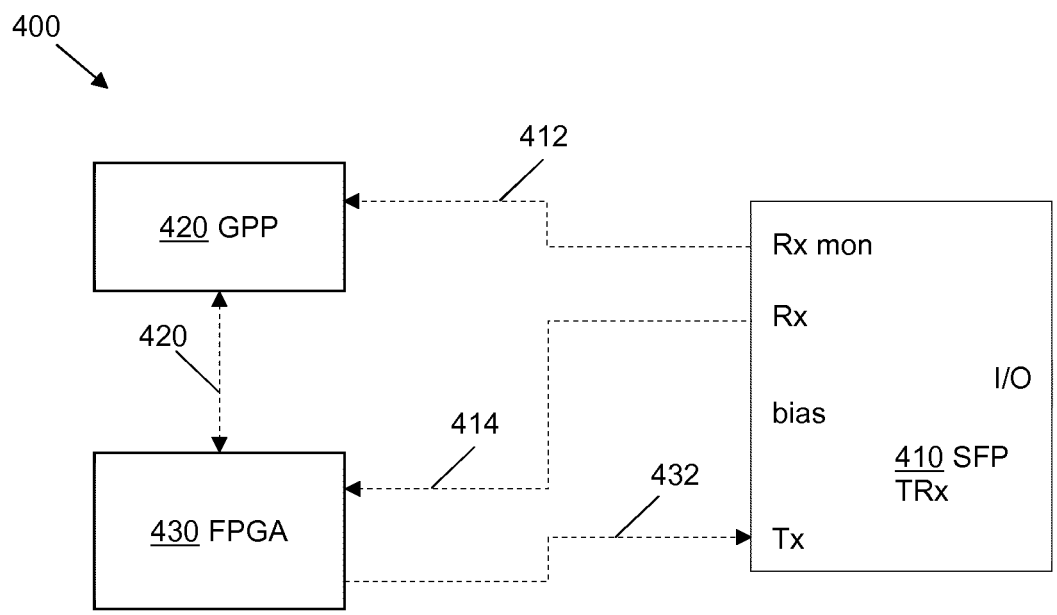

FIG. 11 illustrates optical transceiver apparatus 400 according to an embodiment of the invention, which is similar to the optical transceiver apparatus 350 of the previous embodiment.

In this embodiment, the SFP TRx 410 has a Tx port, an Rx port and an Rx monitoring port (Rx mon). The Tx port is used to receive FEC codeword sequences and modified FEC codeword sequences from the FPGA 430, for transmission on an optical carrier signal from the optical input/output, I/O, port. The Rx port delivers received RS FEC codewords to the FPGA. The Rx monitoring port is used for the GPP to read local configuration data from the SFP TRx.

The FPGA 430 is configured to performs the following functions:
  RS (255, 239) FEC encoding and decoding;
  creation of code violations within RS FEC codewords;
  correlation of code violation patterns with stored predetermined START, STOP and ACK message patterns and with Bit 0 and Bit 1 configuration payload patterns;
  sending an acknowledgment signal through the synch port when a message pattern or a configuration payload pattern is detected.

The GPP 420 is configured to:
  write received 'remote' configuration data to the memory of the SFP TRx;
  read local configuration data from the memory of the SFP TRx;
  send an acknowledgement signal to the FPGA when monitoring data need to be sent or their transmission needs to be stopped;
  receive an acknowledgement signal from the FPGA that notify the start and end of transmission of local configuration data.

Figure 12:
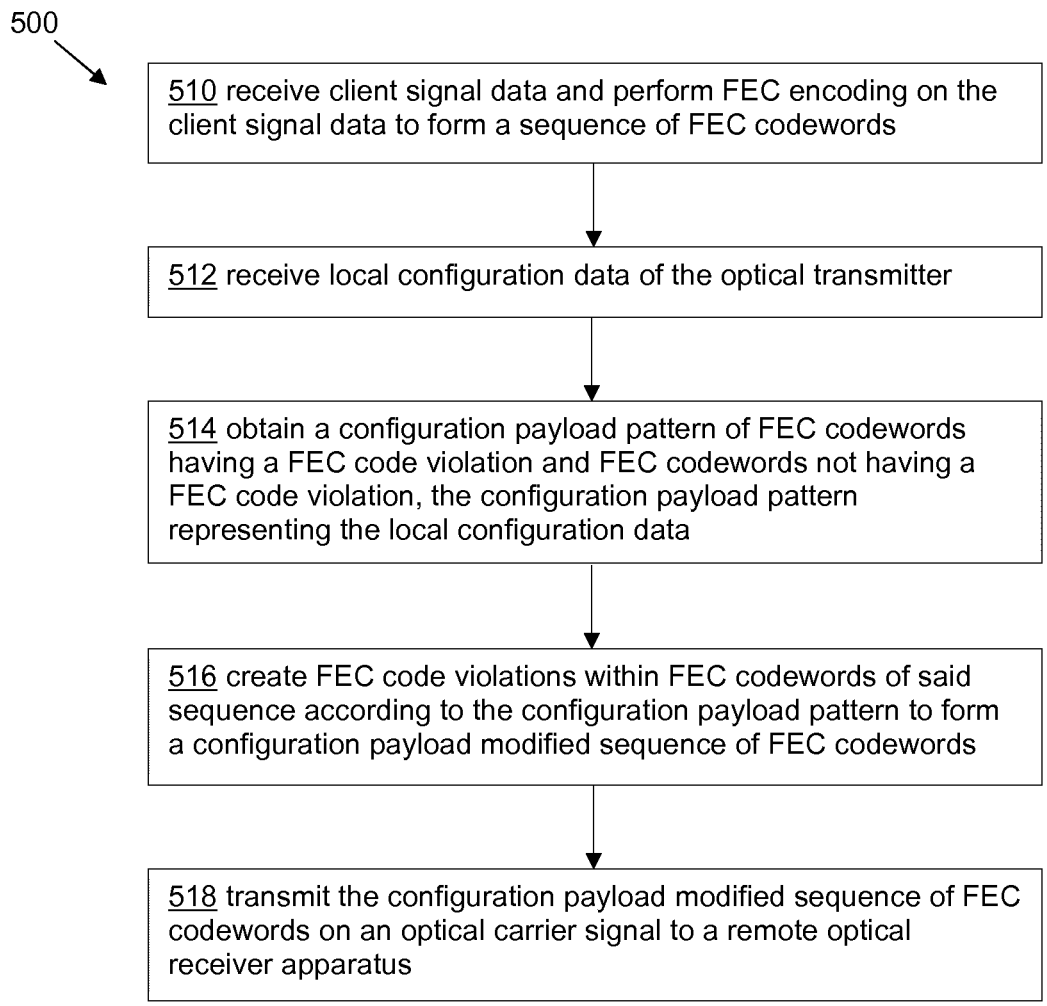
FIG. 12 illustrates steps of methods at optical transmitter apparatus of an optical communication network, according to an embodiment of the invention.

An embodiment of the invention provides a method 500 at optical transmitter apparatus of an optical communications network, having the steps illustrated in FIG. 12. The method 500 comprises receiving 510 client signal data and performing forward error correction, FEC, encoding on the client signal data to form a sequence of FEC codewords, and receiving 512 local configuration data of the optical transmitter. The method comprises obtaining 514 a configuration payload pattern representing the local configuration data. The configuration payload pattern is a pattern of FEC codewords having a FEC code violation and FEC codewords not having a FEC code violation. The method comprises creating 516 FEC code violations within FEC codewords of the sequence of FEC codewords according to the configuration payload pattern, to form a configuration payload modified sequence of FEC codewords, and transmitting 518 the configuration payload modified sequence of FEC codewords on an optical carrier signal to a remote optical receiver apparatus.

Figure 13:
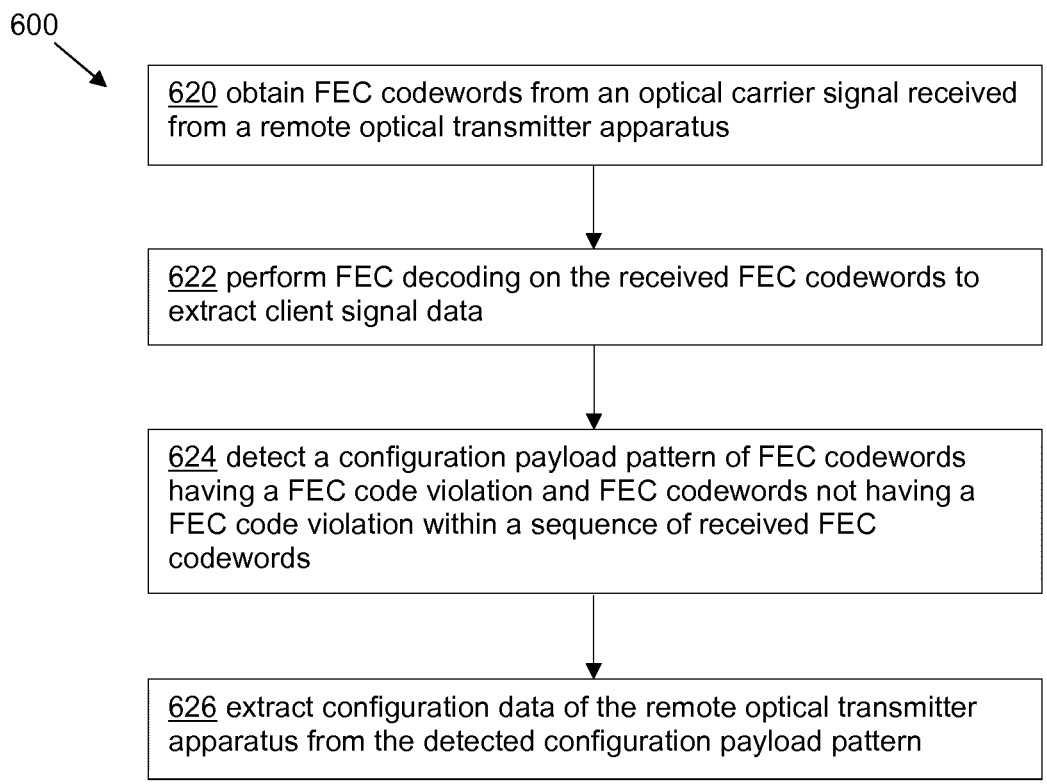
FIG. 13 illustrates steps of methods at optical receiver apparatus of an optical communication network, according to an embodiment of the invention.

An embodiment of the invention provides a method 600 at optical receiver apparatus of an optical communications network, having the steps illustrated in FIG. 13. The method 600 comprises obtaining 620 FEC codewords from an optical carrier signal received from a remote optical transmitter apparatus and performing 622 FEC decoding on the received FEC codewords to extract client signal data. The method comprises detecting 624 a configuration payload pattern within a sequence of received FEC codewords. A configuration payload pattern is a pattern of FEC codewords having a FEC code violation and FEC codewords not having a FEC code violation. The method comprises extracting 626 configuration data of the remote optical transmitter apparatus from the detected configuration payload pattern.

Figure 14:
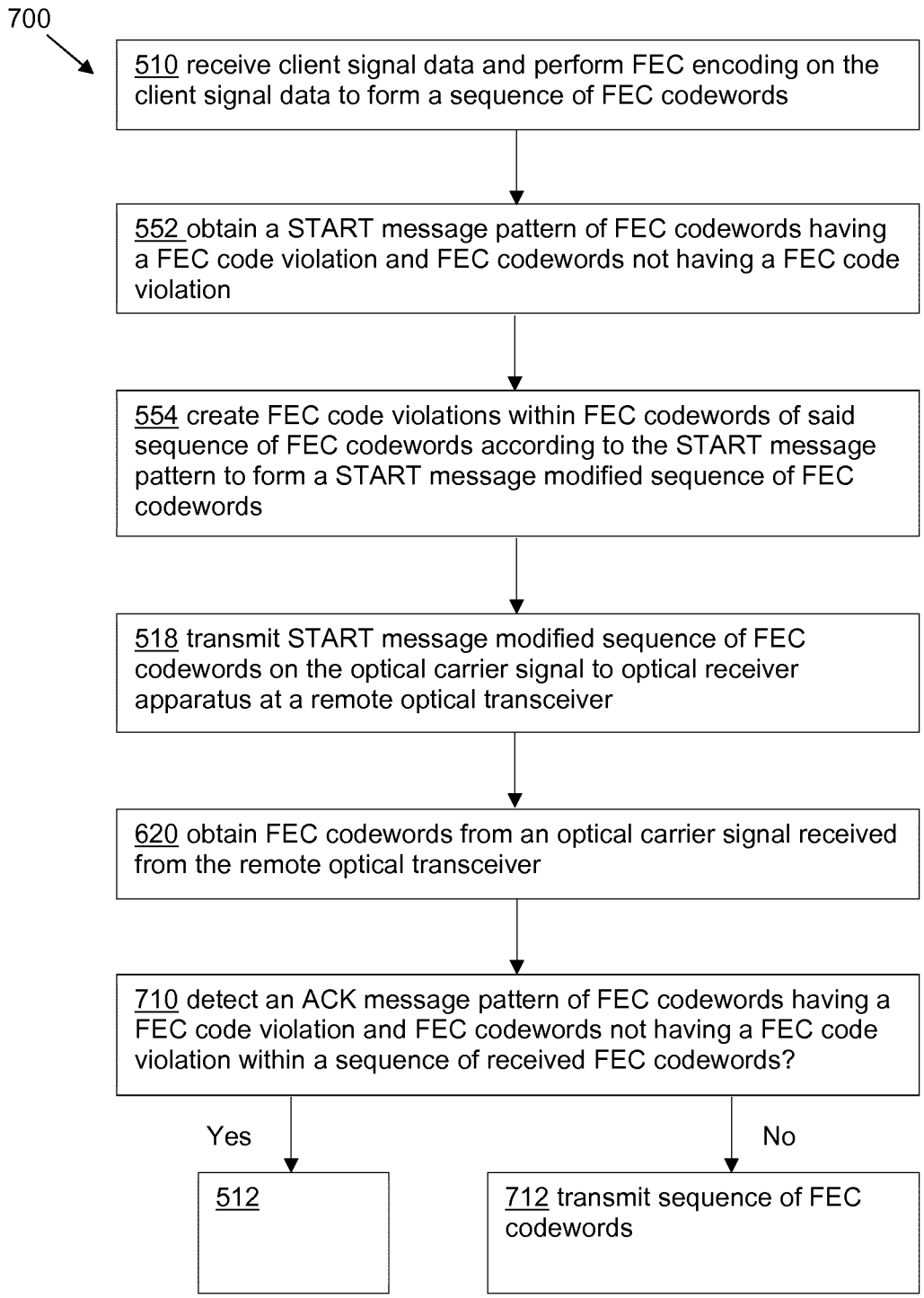
FIG. 14 illustrates steps of methods at optical transceiver apparatus of an optical communication network, according to an embodiment of the invention.

An embodiment of the invention provides a method 700 at optical transceiver apparatus of an optical communications network, having the steps illustrated in FIG. 14. In a transmission aspect, the method comprises receiving 510 client signal data and performing forward error correction, FEC, encoding on the client signal data to form a sequence of FEC codewords. The method comprises obtaining 552 a START message pattern. The start message pattern is a predetermined pattern of FEC codewords having a FEC code violation and FEC codewords not having a FEC code violation. The method comprises creating 554 FEC code violations within FEC codewords of the sequence of FEC codewords according to the START message pattern, to form a START message modified sequence of FEC codewords. The method comprises transmitting 518 the START message modified sequence of FEC codewords on the optical carrier signal to optical receiver apparatus at a remote optical transceiver.

In a receiving aspect, the method comprises receiving an optical carrier signal from a remote optical transceiver apparatus and obtaining FEC codewords from the received optical carrier signal. The method comprises detecting an ACK message pattern within a sequence of received FEC codewords. The ACK message pattern is a predetermined pattern of FEC codewords having a FEC code violation and FEC codewords not having a FEC code violation.

If an ACK message pattern is detected, the method proceeds 512 as in the method 500 illustrated in FIG. 12. If an ACK message pattern is not detected, the method comprises transmitting the client data signal sequence of FEC codewords, without encoding any local configuration data onto the FEC codewords by creating code violations.

An embodiment of the invention provides a computer program, comprising instructions which, when executed on at least one processor, cause the at least one processor to carry out the method 500 at optical transmitter apparatus of an optical communications network.

An embodiment of the invention provides a computer program, comprising instructions which, when executed on at least one processor, cause the at least one processor to carry out the method 600 at optical receiver apparatus of an optical communications network.

The invention claimed is:

1. Optical transmitter apparatus comprising:
a transmitter optical subassembly configured to transmit forward error correction, FEC, codewords on an optical carrier signal;
a memory device containing local configuration data; and
processing circuitry configured to:
receive client signal data and perform FEC encoding on the client signal data to form a sequence of FEC codewords;
receive local configuration data from the memory device;
obtain a configuration payload pattern of FEC codewords having a FEC code violation and FEC codewords not having a FEC code violation, the configuration payload pattern representing the local configuration data;
create FEC code violations within FEC codewords of said sequence according to the configuration payload pattern to form a configuration payload modified sequence of FEC codewords; and
provide the configuration payload modified sequence of FEC codewords to the transmitter optical subassembly for transmission.

2. Optical transmitter apparatus according to claim 1, wherein the processing circuitry is further configured to:
obtain a START message pattern of FEC codewords having a FEC code violation and FEC codewords not having a FEC code violation;
create FEC code violations within FEC codewords of said sequence of FEC codewords according to the START message pattern to form a START message modified sequence of FEC codewords; and
provide the START message modified sequence of FEC codewords to the transmitter optical subassembly for transmission before transmission of the configuration payload modified sequence of FEC codewords.

3. Optical transmitter apparatus according to claim 1, wherein the FEC code violations are FEC correctable errors.

4. Optical transmitter apparatus according to claim 1, wherein the FEC code violations are non-sequential.

5. Optical transmitter apparatus according to claim 1, wherein obtaining a configuration payload pattern comprises mapping the local configuration data to one of a plurality of predetermined configuration payload patterns each representing at least one bit of data.

6. Optical transmitter apparatus according to claim 1, wherein the processing circuitry is configured to apply an XOR mask to a FEC codeword to create a FEC code violation within the FEC codeword.

7. Optical transceiver apparatus comprising:
optical transmitter apparatus according to claim 1; and
optical receiver apparatus comprising:
a receiver optical subassembly configured to obtain FEC codewords from an optical carrier signal received from a remote optical transmitter apparatus; and
processing circuitry configured to:
perform FEC decoding on the received FEC codewords to extract client signal data;
detect a configuration payload pattern of FEC codewords having a FEC code violation and FEC codewords not having a FEC code violation within a sequence of received FEC codewords; and
extract configuration data of the remote optical transceiver from the detected configuration payload pattern.

8. Optical receiver apparatus comprising:
a receiver optical subassembly configured to obtain FEC codewords from an optical carrier signal received from a remote optical transmitter apparatus; and
processing circuitry configured to:
perform FEC decoding on the received FEC codewords to extract client signal data;

detect a configuration payload pattern of FEC codewords having a FEC code violation and FEC codewords not having a FEC code violation within a sequence of received FEC codewords; and extract configuration data of the remote optical transceiver from the detected configuration payload pattern.

9. Optical receiver apparatus according to claim 8, wherein the processing circuitry is configured to:

detect a START message pattern of FEC codewords having a FEC code violation and FEC codewords not having a FEC code violation within a sequence of received FEC codewords; and detect a configuration payload pattern of FEC codewords having a FEC code violation and FEC codewords not having a FEC code violation within a subsequent sequence of received FEC codewords.

10. Optical receiver apparatus according to claim 8, wherein the processing circuitry is configured to correlate detected patterns of FEC codewords having a FEC code violation and FEC codewords not having a FEC code violation with at least one of a plurality of stored configuration payload patterns and a START message pattern to detect at least one of a configuration payload pattern and a START message pattern within a sequence of received FEC codewords.

11. Optical receiver apparatus according to claim 8, wherein the processing circuitry is configured to apply a decorrelation filter to a detected configuration payload pattern to extract configuration data of the remote optical transmitter apparatus.

12. Optical receiver apparatus according to claim 8, wherein the processing circuitry is configured to apply an XOR mask to a received FEC codeword to remove a codeword violation from the FEC codeword.

13. A method at optical transmitter apparatus of an optical communications network comprising steps of:

receiving client signal data and performing forward error correction, FEC, encoding on the client signal data to form a sequence of FEC codewords;

receiving local configuration data of the optical transmitter;

obtaining a configuration payload pattern of FEC codewords having a FEC code violation and FEC codewords not having a FEC code violation, the configuration payload pattern representing the local configuration data;

creating FEC code violations within FEC codewords of said sequence according to the configuration payload pattern to form a configuration payload modified sequence of FEC codewords; and transmitting the configuration payload modified sequence of FEC codewords on an optical carrier signal to a remote optical receiver apparatus.

14. A computer program, comprising instructions which, when executed on at least one processor, cause the at least one processor to carry out the method according to claim 13.

15. A method at optical receiver apparatus of an optical communications network comprising steps of:

obtaining FEC codewords from an optical carrier signal received from a remote optical transmitter apparatus;

performing FEC decoding on the received FEC codewords to extract client signal data;

detecting a configuration payload pattern of FEC codewords having a FEC code violation and FEC codewords not having a FEC code violation within a sequence of received FEC codewords; and extracting configuration data of the remote optical transmitter apparatus from the detected configuration payload pattern.

* * * * *

UNITED STATES PATENT AND TRADEMARK OFFICE
CERTIFICATE OF CORRECTION

PATENT NO. : 11,290,207 B2  
APPLICATION NO. : 16/976186  
DATED : March 29, 2022  
INVENTOR(S) : Cavaliere et al.

Page 1 of 1

It is certified that error appears in the above-identified patent and that said Letters Patent is hereby corrected as shown below:

On the Title Page

Under item (72), under Inventors, after "Paolo Debenedetti" please delete, "Genoa (IT)" and please insert -- Genova (IT) --, therefor.

Signed and Sealed this  
Twenty-third Day of August, 2022

Katherine Kelly Vidal  
*Director of the United States Patent and Trademark Office*